US 6,661,424 B1

(12) United States Patent
Alcorn et al.

(10) Patent No.: US 6,661,424 B1
(45) Date of Patent: Dec. 9, 2003

(54) ANTI-ALIASING IN A COMPUTER GRAPHICS SYSTEM USING A TEXTURE MAPPING SUBSYSTEM TO DOWN-SAMPLE SUPER-SAMPLED IMAGES

(75) Inventors: Byron A Alcorn, Ft Collins, CO (US); Darel N Emmot, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 417 days.

(21) Appl. No.: 09/611,503

(22) Filed: Jul. 7, 2000

(51) Int. Cl.[7] .................................................. G09G 5/00
(52) U.S. Cl. ....................................... 345/611; 345/581
(58) Field of Search ........................ 345/611–616, 429, 345/613–614, 581–588, 428, 421; 382/266, 269, 199, 263

(56) References Cited

U.S. PATENT DOCUMENTS

| | | | | |
|---|---|---|---|---|
| 5,222,205 A | * | 6/1993 | Larson et al. | 345/587 |
| 5,548,709 A | * | 8/1996 | Hannah et al. | 345/552 |
| 5,835,096 A | * | 11/1998 | Baldwin | 345/582 |
| 5,977,977 A | * | 11/1999 | Kajiya et al. | 345/418 |
| 6,417,861 B1 | * | 7/2002 | Deering et al. | 345/589 |
| 6,567,098 B1 | * | 5/2003 | D'Amora | 345/611 |

FOREIGN PATENT DOCUMENTS

| | | | | |
|---|---|---|---|---|
| EP | 0447227 A2 | 9/1991 | | G06F/15/72 |
| EP | 1014306 A2 | 6/2000 | | G06T/11/00 |

* cited by examiner

*Primary Examiner*—Matthew C. Bella
*Assistant Examiner*—Anthony Blackman

(57) ABSTRACT

Methods and apparatus are provided for performing scene anti-aliasing in a computer graphics system including a rasterizer, a texture mapping subsystem and a frame buffer. The method includes the steps of defining a supersample image buffer and a single sample image buffer, using the rasterizer to render a supersampled image to the supersample image buffer, and using the texture mapping subsystem to downsample the supersample image to the single sample image buffer. The downsampled image in the single sample image buffer is anti-aliased. The supersample image buffer and the single sample image buffer are preferably allocated in the frame buffer. The downsampling operation is preferably performed at the time of double buffer swap.

21 Claims, 7 Drawing Sheets

ANTI-ALIASING IN A COMPUTER GRAPHICS SYSTEM USING A TEXTURE MAPPING SUBSYSTEM TO DOWN-SAMPLE SUPER-SAMPLED IMAGES

FIELD OF THE INVENTION

This invention relates to computer graphics systems and, more particularly, to methods and apparatus for full scene anti-aliasing in texture mapping computer graphics systems.

BACKGROUND OF THE INVENTION

Computer graphics systems are used for displaying graphical representations of objects on a two-dimensional display screen. In a typical computer graphics system, an object to be represented on a display screen is broken down into multiple graphics primitives. Primitives are basic components of a graphics image and may include points, lines, vectors and polygons, such as triangles. Typically, a hardware/software scheme is implemented to render, or draw, on the two-dimensional display screen, the graphics primitives that represent a view of one or more objects being represented on the screen.

Typically, the primitives that define the three-dimensional object to be rendered are provided from a host computer, which defines each primitive in terms of primitive data. For example, when the primitive is a triangle, the host computer may define the primitive in terms of the X,Y,Z coordinates of its vertices, as well as the R,G,B color values of each vertex. Rendering hardware interpolates the primitive data to compute the display screen pixels that represent each primitive, and the R,G,B values for each pixel.

Aliasing is an effect that occurs in computer graphics systems because of the discrete nature of the pixels that make up a graphics display. An example of aliasing is the jagged edges in the graphics display of polygons that should in fact have smooth edges. The jagged edges result from a rendering process wherein each pixel is determined to be inside or outside the polygon.

Prior art anti-aliasing techniques include scene antialiasing and polygon anti-aliasing. True scene anti-aliasing involves supersampling of each pixel being rendered. A filter is applied to the supersampled area to remove aliasing artifacts, effectively smoothing out jagged edges. The entire image being rendered is anti-aliased. Polygon anti-aliasing applies anti-aliasing filters to the edges of polygons to smooth out their edges. Non-polygonal primitives are not anti-aliased unless another primitive specific filtering technique is utilized.

Texture mapping is commonly used in computer graphics systems to provide improved surface detail. Texture mapping involves mapping a source image, referred to as a texture, onto a surface of a three-dimensional object, and thereafter mapping the textured three-dimensional object to the two-dimensional display screen. The texture mapping involves applying one or more point elements (texels) of a texture to each point element (pixel) of the displayed portion of the object to which the texture is being mapped. Texture mapping hardware is conventionally provided with information indicating the manner in which the texels in a texture map correspond to the pixels on the display screen that represent the object. Each texel in a texture map is defined by S and T coordinates which identify its location in the two-dimensional texture map. In the case of a three-dimensional texture map, each texel is defined by S, T and R coordinates. For each pixel, the corresponding texel or texels that map to it are accessed from the texture map and are incorporated into the final R,G,B values generated for the pixel to represent the textured object on the display screen.

Each pixel in an object primitive may not map in a one-to-one correspondence with a single texel in the texture map. Depending on the size of the object on the display screen and the size of the texture map, a single pixel may map to multiple texels, or a single texel may map to multiple pixels. To facilitate texture mapping, a series of MIP maps may be created for each texture. A series of MIP maps includes a base map that corresponds directly to the texture map and a series of filtered maps, wherein each successive map is reduced in size by a factor of two in each of the two texture map dimensions. The series of texture MIP maps associated with the object being rendered is stored in a local memory accessible by the texture mapping hardware.

The texture mapping hardware can access texture data from any of the series of MIP maps. The determination of which map to access to provide the texel data for any particular pixel is based on the number of texels to which the pixel maps. If a pixel maps in a one-to-one correspondence with a single texel in the texture map, then the base map is accessed. However, if the pixel maps to 4, 16 or 64 texels, then different level maps in the series are accessed because those maps store texel data representing an average of 4, 16 and 64 texels in the texture map.

A pixel may not map directly to any one texel in the selected map and may fall between two or more texels in a single map or may fall between two maps. In this case, interpolation is utilized to accurately produce texel data. The texel data corresponding to a pixel can be a weighted average of four texel entries in a single map or a weighted average of eight texels in the two closest maps.

It is desirable to provide anti-aliasing in texture mapping computer graphics systems. The anti-aliasing functionality should be provided with a minimum of additional hardware and should use existing functionality to the extent possible

SUMMARY OF THE INVENTION

According to a first aspect of the invention, a method is provided for performing scene anti-aliasing in a computer graphics system comprising a rasterizer, a texture mapping subsystem and a frame buffer. The method comprises steps of defining a supersample image buffer and a single sample image buffer, using the rasterizer to render a supersampled image to the supersample image buffer, and using the texture mapping subsystem to downsample the supersampled image to the single sample image buffer, wherein the downsampled image in the single sample image buffer is anti-aliased.

Preferably, the supersample image buffer and the single sample image buffer are allocated in the frame buffer. The image buffers may be allocated by pseudo-linear frame buffer mapping.

The computer graphics systems preferably utilizes a double buffer configuration, including a first buffer for rendering and a second buffer for display. The first and second buffers are swapped following completion of rendering and display of an image. The step of downsampling the supersampled image to the single sample image buffer is preferably performed at the time of double buffer swap.

The downsampling operation may comprise a four to one downsampling operation, such as a bilinear interpolation. In one embodiment, the downsampling operation is a single operation for each pixel. In another embodiment, the downsampling operation comprises a first downsampling operation to provide an intermediate image and a second downsampling operation of the intermediate image to provide a final downsampled image.

According to another aspect of the invention, apparatus is provided for performing scene anti-aliasing in a computer graphics system comprising a rasterizer, a texture mapping subsystem and a frame buffer. The apparatus comprises means for defining a supersample image buffer and a single sample image buffer, means for using the rasterizer to render a supersampled image to the supersample image buffer, and means for using the texture mapping subsystem to downsample the supersampled image to the single sample image buffer, wherein the downsampled image in the single sample image buffer is anti-aliased.

According to a further aspect of the invention, apparatus is provided for scene anti-aliasing in a computer graphics system. The apparatus comprises a frame buffer containing a supersample image buffer for storing a supersampled image and a single sample image buffer for storing a downsampled image, a rasterizer for rendering a supersampled image to the supersample image buffer in response to information defining an image, and a texture mapping subsystem for downsampling the supersampled image to the single sample image buffer. The downsampled image in the single sample image buffer constitutes an anti-aliased image.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
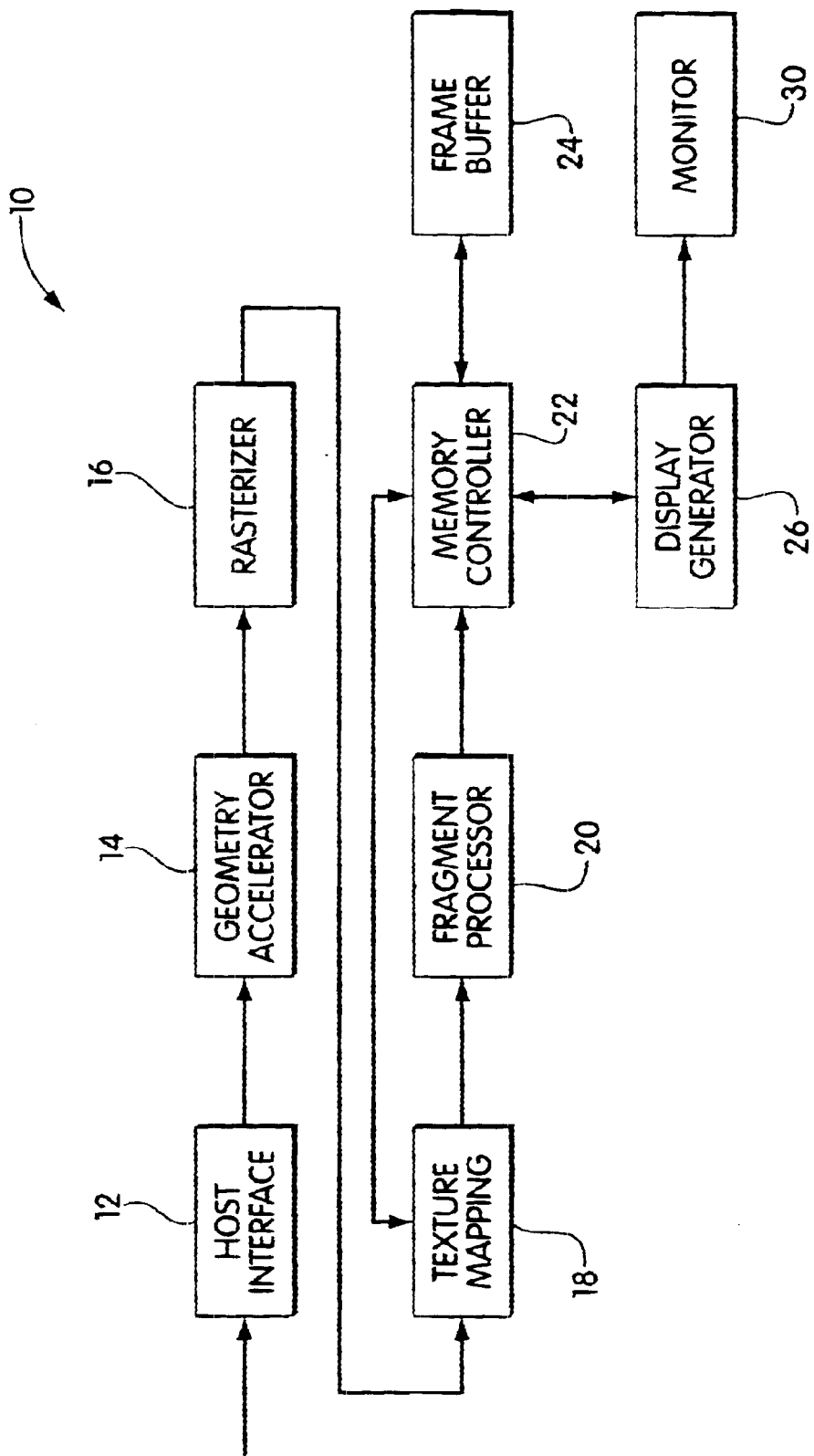
FIG. 1 is a block diagram of one embodiment of a computer graphics system.

A simplified block diagram of one embodiment of a computer graphics system 10 is shown in FIG. 1. The system 10 as shown includes a host interface 12, a geometry accelerator 14, a rasterizer 16, a texture mapping subsystem 18, a fragment processor 20, a memory controller 22, a memory in the form of a frame buffer 24 and a display generator 26. The system outputs pixel data for controlling the pixels of a monitor 30.

The host interface 12 communicates with a host computer (not shown) and receives data representing primitives to be rendered from the host computer. The primitives are specified by X,Y,Z vector coordinate data, R,G,B color data and S,T texture coordinates for portions of the primitives, such as the vertices of a triangle.

The geometry accelerator 14 transforms the X,Y,Z coordinates that define the primitives into corresponding screen space coordinates, determines object R,G,B color values and texture S,T values for the screen space coordinates, decomposes primitive quadrilaterals into triangles and computes a triangle plane equation to define each triangle.

The rasterizer 16 interpolates the rendering parameters generated by the geometry accelerator 14 to determine X and Y coordinates and color values for each pixel of each triangle. The rasterizer 16 interpolates the X,Y pixel coordinates and interpolates S and T coordinates that correspond to each X,Y screen display pixel that represents a primitive. In the rasterization process, the edges of triangles are determined, and then the pixels along each edge are determined, for example, by interpolating between the vertex information. Then the pixels along each span line between the edges are determined by interpolation of the edge information. When anti-aliasing is enabled, the rasterizer 16 renders a supersampled image, as described below.

For each pixel, the texture mapping subsystem 18 accesses portions of one or more texture MIP maps in frame buffer 24 that correspond to the pixel and computes resultant texture data for the pixel. The resultant texture data may include a weighted average of multiple pixels. As described below, the texture mapping subsystem 18 also performs downsampling of the supersampled image as a part of the anti-aliasing process.

The fragment processor 20 performs per pixel operations on the output data from the rasterizer 16 and the texture mapping subsystem 18. The fragment processor 20 may perform operations such as window clipping, color keying, texture application and fog application.

The memory controller 22 controls frame buffer 24. In the embodiment of FIG. 1, frame buffer 24 is used for storage of image data and texture mapping data.

Display generator 26 accesses the final image data in frame buffer 24 through memory controller 22. The display generator 26 generates the color values for each pixel to be displayed on monitor 30.

Figure 2:
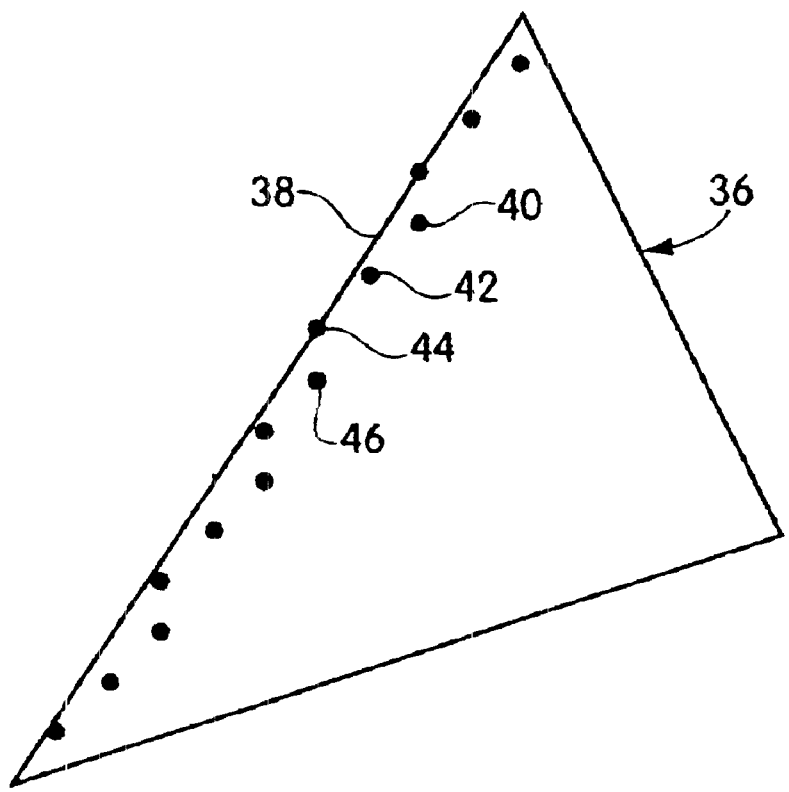
FIG. 2 is a schematic illustration of aliasing of a polygon in a computer graphics system.

FIG. 2 is a schematic illustration of aliasing of a poligon in a computer graphics system. A triangle 36 is rendered by rasterizer 16 (FIG. 1). The pixels along each edge of triangle 36 may be determined by interpolating between vertex information. An edge 38 of triangle 36 may be defined by pixels 40, 42, 44, 46, etc. in successive rows of the pixel space. Because the pixel locations are discrete in nature, the closest pixels to edge 38 are spaced from edge 38 by different distances, thereby creating a jagged edge in the graphics display of triangle 36. This effect is referred to as aliasing. The aliasing effect may be reduced by an anti-aliasing technique described below, with very little increased circuitry and complexity.

Figure 3:
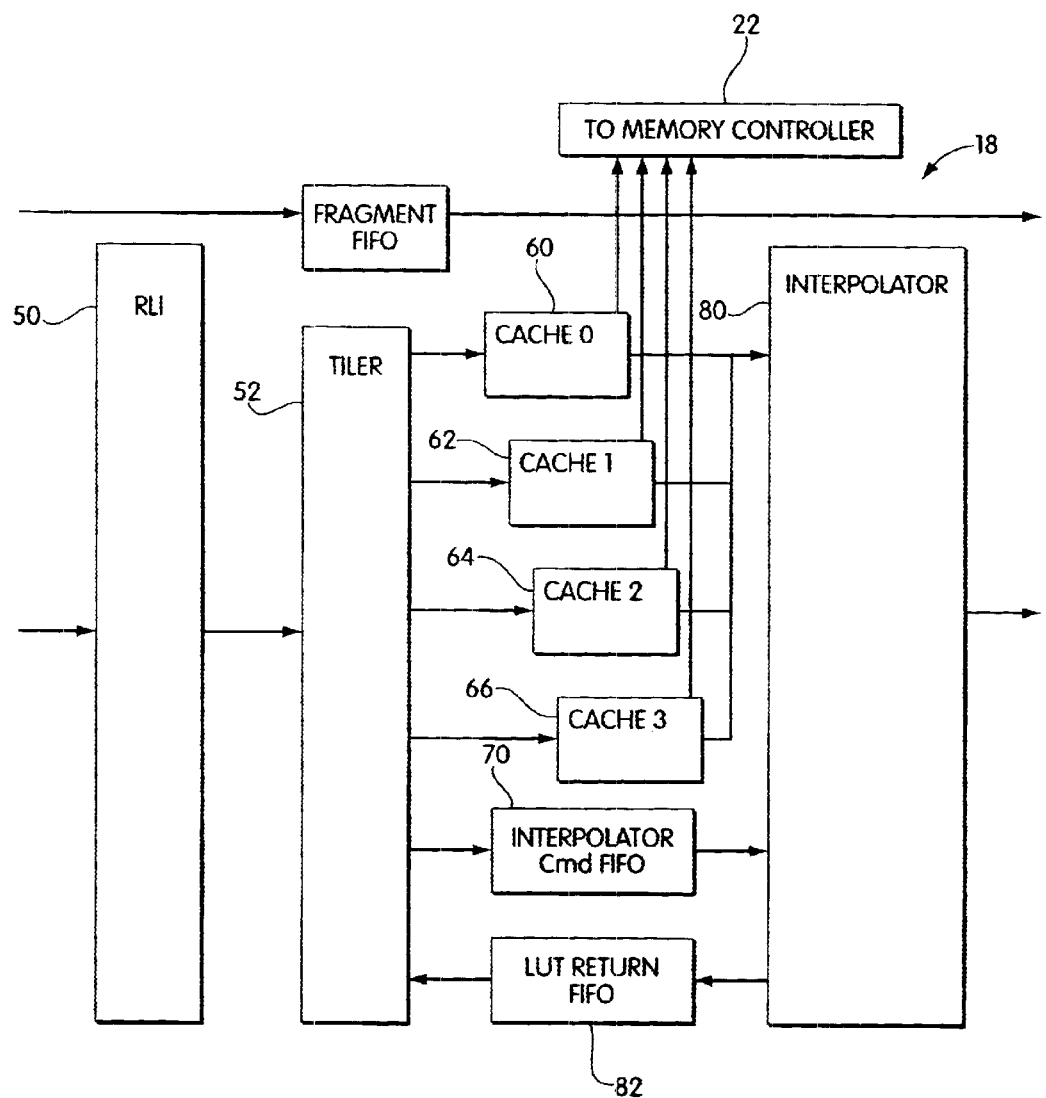
FIG. 3 is a block diagram of an embodiment of the texture mapping subsystem of FIG. 1.

A simplified block diagram of texture mapping subsystem 18 is shown in FIG. 3. Pixel data is received from rasterizer 16 by a rasterizer interface 50 and is supplied to a tiler 52. The output of tiler 52 is supplied to cache memories 60, 62, 64 and 66, and to an interpolator command FIFO 70. The outputs of cache memories 60, 62, 64 and 66 are supplied to an interpolator 80 and to memory controller 22. A lookup table (LUT) return FIFO 82 is coupled between interpolator 80 and tiler 52. The tiler 52 includes a memory mapping unit for allocation of texture maps to frame buffer 24.

A primary function of the texture mapping subsystem 18 is to map a texture onto the surface of an object, where the object is represented by an array of pixels. As discussed above, the texture may not map directly to the pixels and usually requires interpolation. In particular, a pixel may fall between two or more texels in a single texture map. In this case, the texture data corresponding to a pixel may be the weighted average of four texels in a single texture map. Furthermore, pixels may fall between two texture maps. In this case, the texture mapping subsystem 18 may interpolate between the two closest MIP maps to determine the resultant texture data for a pixel. Thus, the resultant texture data for one pixel may be a weighted average of eight texels, i.e., the four closest texels in each of the two closest texture maps. In another mode, the texture data for a single pixel may be calculated as the weighted average of sixteen texels, i.e., the eight closest texels in each of the two closest texture maps. The interpolations involved in texture mapping are performed for each pixel of each object having a texture.

Personal computers (PCs) typically employ a linear memory allocation scheme. The linear memory allocation system subdivides memory into blocks and then allocates a number of consecutive blocks for a given use. In a computer graphics system, a linear memory allocation scheme is convenient to allow flexible utilization of the memory, rather than dedicating memory to specific uses. However, a purely linear memory allocation scheme does not provide optimum rendering performance.

A modification of the linear memory allocation scheme, known as pseudo-linear frame buffer mapping, strikes a compromise between PC requirements for a linear, completely configurable frame buffer and the advantages of rectangular pages. Rather than treating the frame buffer as a linear array of words, this method treats the frame buffer as a linear array of blocks. Each block is a small two-dimensional array of memory, which is designed to provide optimized access when rendering with two-dimensional locality. A range of blocks can be allocated as a group and given a block stride to provide a larger two-dimensional area. The block stride establishes the X dimension of the image area or texture map in units of blocks.

In one embodiment, frame buffer 24 includes eight SDRAM memory chips divided into four interleaves, with two SDRAM chips in each interleave. Four separate memory controllers are provided, with one corresponding to each interleave, so that the SDRAM chips within each interleave can be accessed simultaneously. Each SDRAM chip includes four distinct banks of memory in which different pages of memory can be accessed in consecutive read cycles without incurring repaging penalties. In this example, each SDRAM chip has a capacity of eight megabytes for a total capacity of 64 megabytes. Each bank in the SDRAM chip contains 4,096 pages of 512 bytes per page.

As described above, pseudo-linear frame buffer mapping treats the frame buffer 24 as a linear array of blocks. Each block is a two-dimensional array of memory which is selected to provide optimized access when rendering with two-dimensional locality. For the memory configuration described above, the block size is 2,048 bytes, arranged as 64 bytes wide by 32 pixels in height. Each block directly maps to portions of two banks in the SDRAM chips. A total of four blocks is needed to completely use up a page in two banks of memory. Eight blocks are needed to use up a page in all four banks of memory.

Pseudo-linear frame buffer mapping involves the mapping of an array of data, such as an array of pixel data representing an image or an array of texel data representing a texture, to block coordinates, followed by memory mapping of the block coordinates to specific rows, banks and pages in the frame buffer 24. An array of data to be mapped to the memory may be characterized by a block number offset (BNO), which is the number of the first memory block of the array, and a block stride (BS), which is the number of sequential blocks in one row of blocks. Thus, for example, an array having a block stride of 4 and containing a total of 16 blocks represents a 4×4 array of blocks. The location of the array of blocks in memory is represented by the block number offset.

Figure 4:
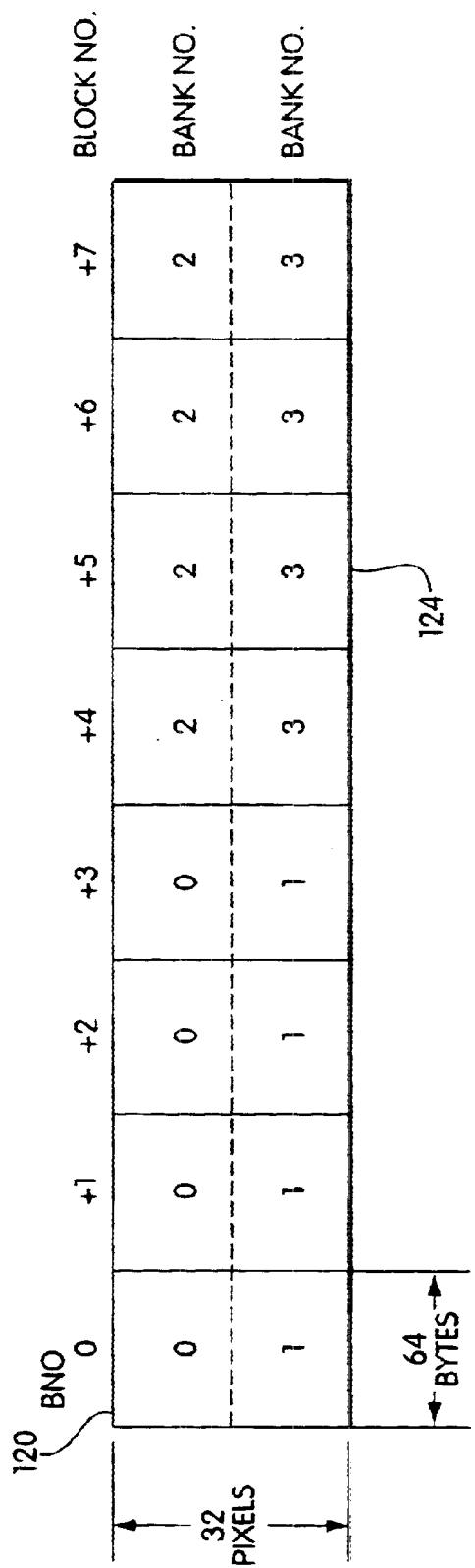
FIG. 4 is a schematic illustration of blocks of data mapped to memory banks in the frame buffer.

An example of mapping blocks of data to memory banks and pages for a frame buffer configured as described above is illustrated in FIG. 4. Each block has a size of 64 bytes wide by 32 pixels in height. Each block is divided between two memory banks. Thus, each of blocks 0–3 is divided between bank 0 and bank 1, and each of blocks 4–7 is divided between bank 2 and bank 3. Blocks 0–7 use up one page of 32 rows of pixels in banks 0–3.

Figure 5:
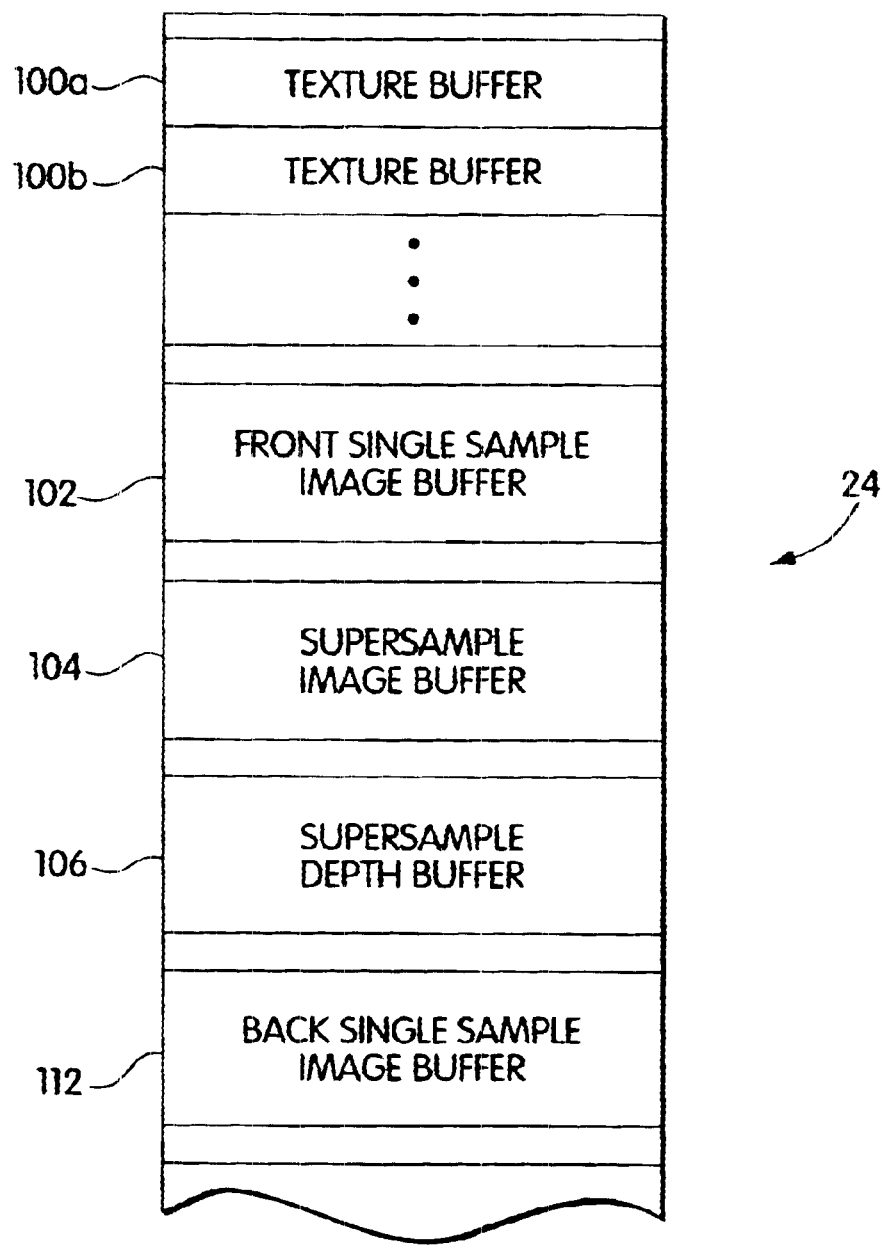
FIG. 5 is a schematic illustration of an example of a frame buffer organization.

An example of a suitable frame buffer 24 organization in accordance with the invention is shown in FIG. 5. Frame buffer 24 may include texture buffers 100a, 100b, etc., which contain texture MIP maps as described above. In addition, frame buffer 24 may contain a front single sample image buffer 102, a supersample image buffer 104, a supersample depth buffer 106 and a back single sample image buffer 112. Each of the buffers shown in FIG. 5 may be allocated using pseudo-linear frame buffer mapping as described above.

The memory organization of FIG. 5 represents a double buffer configuration in which rendering and image display are performed simultaneously. In particular, rasterizer 16 renders image data to one of the buffers, either front or back, and the display generator 26 reads image data from the other buffer for display on monitor 30. When the rendering and display processes are complete, the rendering and display buffers are swapped, so that the buffer previously used for rendering is available for display, and the buffer previously used for display is available for rendering a new image. The double buffer swap may involve transfer of data from one buffer to another or may involve changing attribute bits associated with each buffer and which indicate whether each buffer is currently a rendering buffer or a display buffer.

Referring again to FIG. 5, front single sample image buffer 102 and back single sample image buffer 112 each correspond in size to the image being rendered. By way of example, the image may have dimensions of 1280×1024 pixels. The supersample image buffer 104 is larger than the single sample image buffers to permit supersampling as described below. In one embodiment, the supersample image buffer 104 is four times as large, i.e., two times as large in each dimension, as the single sample buffer. Thus, where the image has dimensions of 1280×1024 pixels, the supersample buffer has dimensions of 2560×2048 pixels. The supersample depth buffer 106 corresponds to the supersample image buffer 104 and contains a depth value corresponding to each pixel in the supersampled image. The buffers shown in FIG. 5 and described above are preferably allocated using the pseudo-linear frame buffer mapping technique described above.

Figure 6:
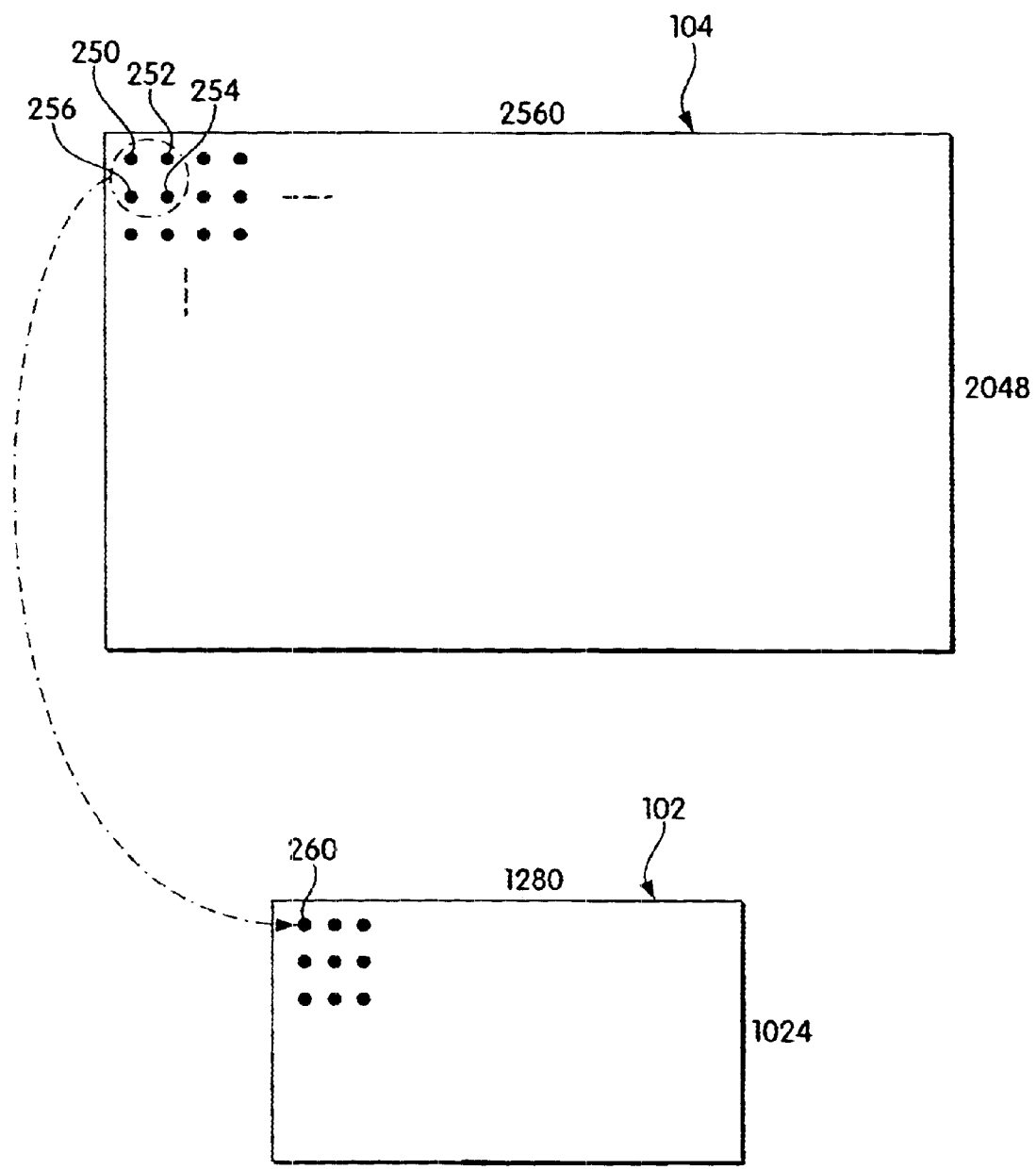
FIG. 6 is a schematic illustration of downsampling from a supersample image buffer to a single sample image buffer.

An example of front single sample image buffer 102 and supersample image buffer 104 is shown in FIG. 6. In the example of FIG. 6, single sample image buffer 102 has dimensions of 1280×1024 pixels, and supersample image buffer 104 has dimensions of 2560×2048 pixels. It will be understood that the image buffer 102 may have different dimensions, depending on the size of the image to be displayed. Furthermore, the supersample image buffer 104 may have different dimensions but is typically a multiple of two times each dimension of the single sample image buffer 102. Supersample image buffer 104 is therefore four times as large as single sample image buffer 102. In another example, the supersample image buffer may be sixteen times as large as the single sample image buffer.

Figure 7:
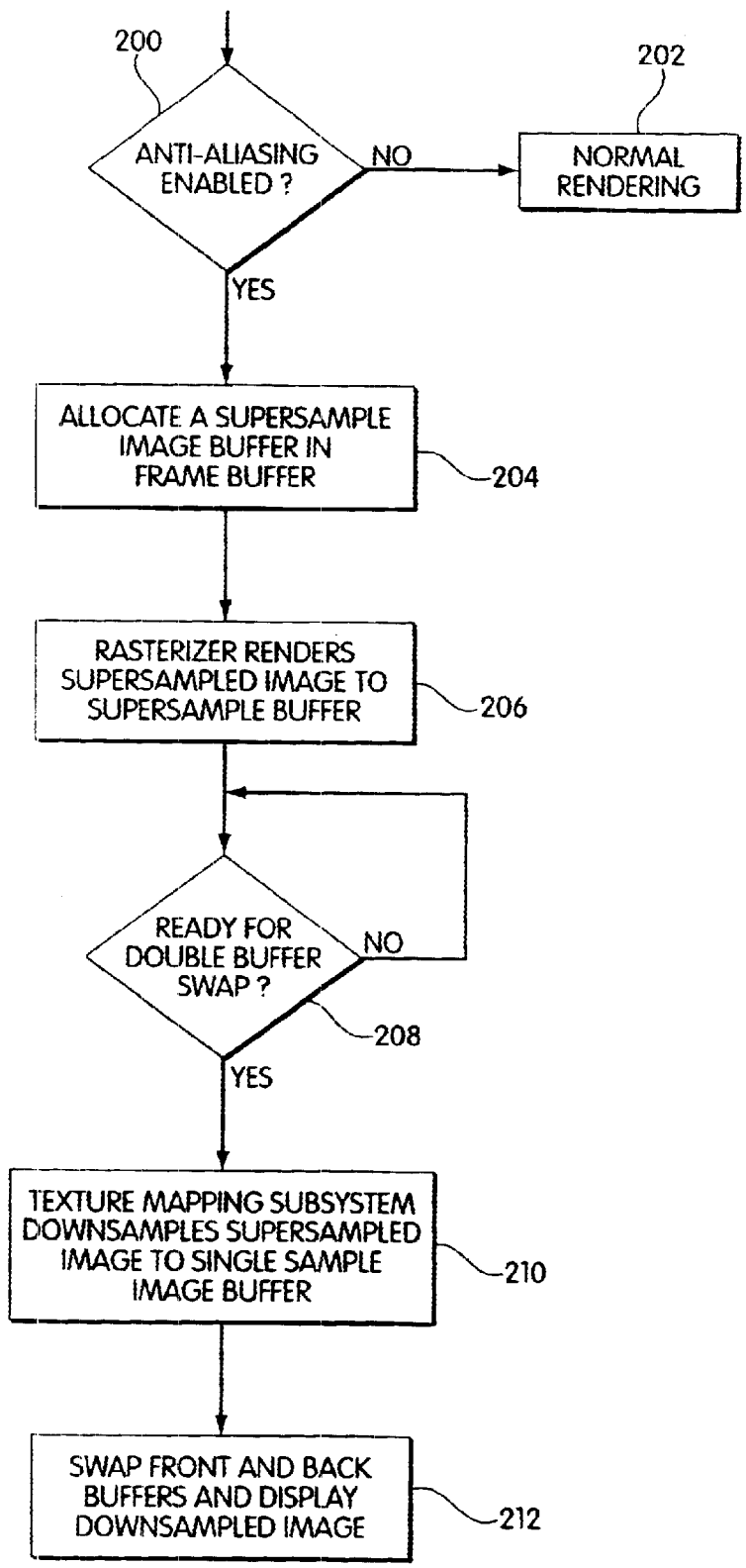
FIG. 7 is a flow chart of a process for scene anti-aliasing in accordance with an embodiment of the invention.

An example of a process for scene anti-aliasing of graphics images in accordance with a feature of the invention is shown in FIG. 7. In step 200, a determination is made as to whether anti-aliasing is enabled in the computer graphics system. The enabling or disabling of anti-aliasing is controlled by the host computer. When anti-aliasing is not enabled, the system proceeds with normal rendering in step 202. Normal rendering involves allocation of an image buffer and depth buffer that are equal in size to the image being rendered. The rasterizer 16 then renders the image to the image buffer in accordance with the normal operation of the graphics system.

If anti-aliasing is determined in step 200 to be enabled, a supersample image buffer is allocated in frame buffer 24 in step 204. As described above, the supersample image buffer may be four times or another selected multiple of the dimensions of the image being rendered. In addition, a supersample depth buffer corresponding to the supersample image buffer is allocated in step 204.

In step 206, rasterizer 16 (FIG. 1) renders a supersampled image to the supersample image buffer that was allocated in step 204. Thus, in the example of FIG. 6, rasterizer 16 renders a supersampled image having dimensions of 2560×2048 pixels. In particular, the rasterizer 16 renders textured color values or untextured color values to the supersample image buffer, depending on whether texture mapping is enabled. Supersample image buffer 104 is used for rendering of the supersampled image. Rendering step 206 is similar to normal rendering, except that a larger than normal image space is utilized. The rasterizer 16 also renders depth values to the supersample depth buffer 106 in step 206.

In step 208, a determination is made as to whether the system is ready for double buffer swap. As noted above, double buffer swap is performed when rendering of an image to the current rendering buffer and display of an image from the current display buffer are complete. When the system is determined in step 208 to be ready for double buffer swap, the texture mapping subsystem 18 downsamples the supersampled image in the supersample image buffer to provide a downsampled, or viewable, image and writes the downsampled image in the corresponding single sample image buffer in step 210. Thus, for example, texture mapping subsystem 18 may downsample the supersampled image in supersample image buffer 104 (FIG. 5) to front single sample image buffer 102.

The downsampling process is described with reference to FIG. 6. In the example of FIG. 6, where the supersample image buffer is four times as large as the single sample image buffer, four pixels in the supersample image buffer correspond to a single pixel in the single sample image buffer. Each group of four pixels in the supersample image buffer is downsampled to a single pixel in the single sample image buffer by interpolation. Thus, for example, pixels 250, 252, 254 and 256 in supersample image buffer 104 may be downsampled to a single pixel 260 in single sample image buffer 102. The interpolation may be a weighted or unweighted average of the corresponding four pixels in the supersample image buffer. The interpolation process is repeated for each set of four pixels in the supersample image buffer to provide the downsampled image in the single sample image buffer. A box filtering interpolation process is typically utilized. Other filtering operations may be utilized within the scope of the invention.

As described above, the texture mapping subsystem 18 performs texture mapping operations by interpolating texels contained in texture maps to determine texture values corresponding to image pixels. The texture mapping system 18 is utilized to perform downsampling of supersampled images by treating the supersampled image as a texture and by performing texture mapping for a polygon that is defined as corresponding to the image area. The texture mapping subsystem 18 thus treats the supersampled image as a texture map and interpolates the pixels in the supersampled image to provide the downsampled image. In this way, the texture mapping subsystem 18 is utilized to perform downsampling of a supersampled image in a full scene anti-aliasing process.

Referring again to FIG. 7, the front and back single sample image buffers are swapped in step 212, and the downsampled image is displayed by display generator 26. As noted above, the front and back image buffers can be swapped by writing the information from one image buffer to the other image buffer or can be swapped by simply changing attribute bits in control information associated with the buffers. Following step 212, the process may be repeated for rendering and downsampling of a new image.

The downsampling operation shown in FIG. 6 and described above involves a single downsampling operation of four pixels to a single pixel. It will be understood that different downsampling operations may be utilized within the scope of the invention. For example, the downsampling operation may involve any desired number of pixels, such as eight or sixteen pixels. The downsampling operation may involve a single interpolation operation or two or more interpolation operations in series. In each case, the downsampling operation is performed by the texture mapping subsystem 18.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method for performing scene and anti-aliasing in a computer graphics system comprising a rasterizer, a texture mapping subsystem and a frame buffer, comprising:
   defining a supersample image buffer and a single sample image buffer;
   using the rasterizer to render a supersampled image to the supersample image buffer; and
   using the texture mapping subsystem to downsample the supersampled image to the single sample image buffer, wherein the downsampled image in the single sample image buffer is anti-aliased.

2. A method as defined in claim 1 wherein defining a supersample image buffer and a single sample image buffer comprises:
   allocating said supersample image buffer and said single sample image buffer in the frame buffer.

3. A method as defined in claim 2 wherein allocating said supersample image buffer and said single sample image buffer is performed utilizing pseudo-linear frame buffer mapping.

4. A method as defined in claim 2 wherein said computer graphics system utilizes a double buffer configuration, including a first buffer for rendering and a second buffer for display, wherein said first and second buffers are swapped following completion of rendering and display, wherein the supersampled image is downsampled to the single sample image buffer at the time of double buffer swap.

5. A method as defined in claim 1 wherein downsampling the supersampled image comprises a four to one downsampling operation.

6. A method as defined in claim 1 wherein downsampling the supersampled image comprises a bilinear interpolation.

7. A method as defined in claim 1 wherein downsampling the supersampled image comprises:

interpolating a selected number of pixels in the supersample image buffer.

8. A method as defined in claim 1 wherein downsampling the supersampled image comprises:

performing a first downsampling operation to provide an intermediate image; and performing a second downsampling operation of the intermediate image to provide a final downsampled image.

9. A method as defined in claim 1 wherein rendering a supersampled image comprises:

dividing the supersampled image into blocks of data; and storing the blocks of data in consecutive blocks of the supersample image buffer.

10. A method as defined in claim 9 wherein downsampling the supersampled image comprises;

dividing the downsampled image into blocks of data: and storing the blocks of data of the downsampled image in consecutive blocks of the single sample image buffer.

11. A method as defined in claim 1 further comprising:

reading the single sample image buffer for display of the downsampled image.

12. In a computer graphics system comprising a rasterizer, a texture mapping subsystem and a frame buffer, apparatus for performing scene anti-aliasing comprising:

means for defining a supersample image buffer and a single sample image buffer;

means for using the rasterizer to render a supersampled image to the supersample image buffer; and means for using the texture mapping subsystem to downsample the supersampled image to the single sample image buffer, wherein the downsampled image in the single sample image buffer is anti-aliased.

13. Apparatus as defined in claim 12 wherein said means for defining a supersample image buffer and a single sample image buffer comprises:

means for allocating said supersample image buffer and said single sample image buffer in the frame buffer.

14. Apparatus as defined in claim 13 wherein said computer graphics system utilizes a double buffer configuration, including a first buffer for rendering and a second buffer for display, wherein said apparatus further comprises:

means for swapping said first and second buffers following completion of rendering and display, wherein said means for downsampling the supersampled image comprises means for performing downsampling at the time of said swapping of said first and second buffers.

15. Apparatus as defined in claim 12 wherein said means for downsampling the supersampled image comprises:

means for performing a four to one downsampling operation.

16. Apparatus as defined in claim 12 wherein said means for downsampling the supersampled image comprises:

means for performing a bilinear interpolation.

17. Apparatus as defined in claim 12 wherein said means for downsampling the supersampled image comprises:

means for downsampling the supersampled image to provide an intermediate image in a first downsampling operation; and means for downsampling the intermediate image to provide a final downsampled image in a second downsampling operation.

18. Apparatus as defined in claim 12 further comprising:

means for reading the single sample image buffer for display of the downsampled image.

19. Apparatus for scene anti-aliasing in a computer graphics system, comprising:

a frame buffer containing a supersample image buffer for storing a supersampled image and a single sample image buffer for storing a downsampled image;

a rasterizer for rendering a supersampled image to the supersample image buffer in response to information defining an image; and a texture mapping subsystem for downsampling the supersampled image to the single sample image buffer, wherein the downsampled image in the single sample image buffer constitutes an anti-aliased image.

20. Apparatus as defined in claim 19 wherein said frame buffer has a double buffer configuration, comprising a first buffer for rendering and a second buffer for display, wherein said first and second buffers are swapped following completion of rendering and display, said apparatus further comprising:

means for performing downsampling of the supersampled image to the single sample image buffer at the time of double buffer swap.

21. A method for performing scene anti-aliasing in a computer graphics system comprising a rasterizer, a texture mapping subsystem and a frame buffer, comprising:

defining a supersample image buffer, a front single sample image buffer and a back single sample image buffer in the frame buffer;

using the rasterizer to render a supersampled image to the supersample image buffer;

using the texture mapping subsystem to downsample the supersampled image to one of the front and back single sample image buffers; and swapping the front and back single sample image buffers, so that the downsampled image is available for display.

* * * * *